3,399,087
CASTABLE PROPELLANT COMPOSITIONS CONTAINING ISOOLEFIN - DIOLEFIN COPOLYMERS

Joseph J. Scigliano, Sacramento, Calif., assignor to Aerojet-General Corporation, Azusa, Calif., a corporation of Ohio
No Drawing. Filed June 8, 1962, Ser. No. 202,351
20 Claims. (Cl. 149—19)

This invention relates to novel cured rubber compositions and solid propellant compositions having as the binder such cured rubber compositions.

In the preparation of propellant formulations, it is desirable that the binder material be in the liquid state during the incorporation of the oxidizer and other additives into the binder. This makes for greatly increased ease of incorporation and handling as compared with binder materials which are rubbery prior to curing.

Previously, it has been a problem to obtain a cured propellant which had high solids loading, was thermally and oxidatively stable, and tough by using as the binder a polymer which is liquid prior to curing. It was thought that a liquid polymer could be used only if it were highly unsaturated to facilitate curing to a tough polymer. In this case the residual unsaturation in the cured product resulted in a lack of storage stability. Thus, the hydrocarbon binders previously used were usually solid and rubbery prior to curing. The use of these binders requires undesirably long mixing times and the expenditure of large amounts of mechanical energy in order to incorporate large amounts of oxidizer. Propellant batches from such materials cannot be poured and cured. Rather such a material must be press cured or otherwise cured under pressure. Further, many of the binders previously used in castable binders contain functional groups which make them unsuitable for use with many oxidizers.

In general, a tough crosslinked rubber is obtained by cross-linking a high molecular weight unsaturated linear rubber. In the case of high molecular linear polymers, relatively few crosslinks are needed to convert it to a tough vulcanizate. Thus, it has been known that a high molecular weight linear isoolefin-diolefin copolymer could be vulcanized to a tough crosslinked rubber. Such tough polymers were obtained since only a few crosslinks are needed to effect vulcanization. Previously, it was not known that a low molecular weight linear isoolefin-diolefin copolymer containing a low amount of ethylenic unsaturation could be crosslinked to a tough rubber.

It is an object of this invention to prepare new cured rubber compositions possessing improved thermal stability and castability prior to curing. It is another object of this invention to prepare highly loaded compositions of these cured rubber compositions. It is still another object to employ these rubbers to obtain highly loaded propellant compositions. In still another aspect it is an object of this invention to employ as the binder in castable solid propellants a polymer which possesses sufficient chemical inertness that it can be used with a wide variety of oxidizers and propellant additives. These and other objects of my invention will be apparent from the description which follows.

It has now been found that certain liquid, hydrocarbon isoolefin-diolefin copolymers are suitable as binders in castable propellant compositions. The propellant batches containing these liquid polymers can be simply poured into forms and cured to obtain a highly stable propellant. The liquidity of the batch prior to curing greatly simplifies handling of the mass.

It has further been found that the linear liquid polymers of this invention can be blended with large amounts of solids without difficulty and without the expenditure of large amounts of mechanical energy in the mixing process. These liquid polymers, therefore, permit of the addition of larger amounts of solids in less time. In fact, it has been found that with the liquid polymers of this invention, there can be prepared a propellant containing over 87% solids, i.e., over 87% oxidizer and combustion additives, based on the total weight of the propellant composition. This high solids content means that the propellants of this invention can not only carry sufficient oxidizer to completely burn the binder, but also the total energy level of the propellant can be raised by the further addition of substantial amounts of combustion additives. This high solids content is achieved without the sacrifice of the physical properties of the cured propellant.

Since the interpolymer binders of this invention contain only carbon and hydrogen, they lend themselves toward higher energy in propellants than other types of binders containing oxygen. Also oxidizers such as lithium perchlorate which contain reactive metallic ions and which cannot be used with oxygenated organic binders, are compatible with the hydrocarbon binders of this invention.

The linear liquid polymers employed in this invention contain relatively few double bonds prior to curing. Since the curing reaction takes place primarily through the double bonds, the cured product is substantially free of ethylenic unsaturation. For this reason, the propellants of my invention are more resistant to thermal and oxidative degradation than are those propellants which retain many carbon to carbon double bonds after curing.

It has now been found that such low molecular weight copolymers can be cured to form a tough, crosslinked propellant composition even though these copolymers contain relatively few crosslinking sites.

The binder material employed in the compositions of this invention is a liquid interpolymer of an aliphatic isoolefin having 4 to about 7 carbon atoms per molecule. Liquid polymers of this type are of low molecular weight and contain relatively low amounts of unsaturation.

More specifically, the polymeric binder material of this invention is a linear, essentially hydrocarbon, liquid, isoolefin-diolefin copolymer having a molecular weight of from about 1000 to about 5000 and consisting essentially of isoolefin units of the formula

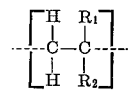

wherein $R_1$ and $R_2$ are lower alkyl of 1 to about 3 carbon atoms such as methyl, ethyl and propyl; and diolefin units of the formula

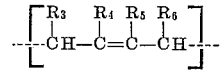

wherein $R_3$, $R_4$, $R_5$, and $R_6$ are selected from the group consisting of hydrogen and lower alkyl of 1 to about 3 carbon atoms. Preferably, $R_3$, $R_4$, $R_5$ and $R_6$ are hydrogen or methyl, but these substituents may also be, for example, ethyl, propyl and isopropyl, the ratio of said isoolefin units to said diolefin units in the polymer chain being from about 20 to 1 to about 100 to 1. These polymers can be cured to tough elastomers by crosslinking agents such as methylol phenol-formaldehyde resins, quinones, and sulfur.

The liquid rubber binders of this invention are prepared from a large proportion of an isoolefin and a small proportion of a diolefin, the isoolefin having the formula

and the diolefin having the formula

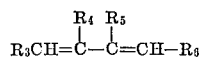

wherein $R_1$, $R_2$, $R_3$, $R_4$, $R_5$, and $R_6$ are as defined above.

The preferred isoolefin for use in the above equation is isobutylene, although other isoolefins such as 2-methyl hexene-1 may be employed. The preferred diolefin is isoprene. However, other diolefins such as butadiene, dimethyl butadiene, piperylene and 2-methyl-1,3, hexadiene may be used.

The reaction takes place at low temperatures in the order of $-30°$ C. to about $+25°$ C. in the presence of a Friedel-Crafts or Lewis-acid type, i.e., an electron acceptor, catalyst. The catalyst is activated by a small amount of a polar solvent such as an alcohol, amine or ketone. Illustrative polar solvents are methanol, methyl amine or dimethyl ketone. These same polar solvents, when added to the polymerization media in large quantities, may be used to deactivate the catalyst and terminate the polymer chain.

The preparation of the polymer may be conducted in the presence of an inert, non-polar diluent such as methyl chloride, butane and pentane, which serves as an aid in controlling the violence of the polymerization reaction.

In the preparation of these polymers, it is necessary that the monomer feeds be richer in diolefin than is the polymer which is sought to be obtained. Thus, if it is desired to prepare a polymer containing a ratio of isoolefin to diolefin units of 40 to 1, it has been found to be necessary to start with a monomer mixture containing a 20 to 1 ratio of isoolefin to diolefin. This is due to the fact that isoolefins normally will more easily polymerize than will the diolefins. In general, it has been found that polymers prepared from monomer feeds containing a ratio of 10 to 1 to 50 to 1 of isoolefin to diolefin are useful as the binders in the propellant compositions of this invention.

During the preparation of the liquid polymer, it is frequently desirable to agitate the medium so as to improve the contact between the reactants. The finished copolymer is isolated in conventional manner by stripping, filtration and/or evaporation.

Preparation of liquid polymer A

A typical preparation of the liquid rubber of this invention is as follows: Isobutylene gas (560 g.) was fed through a flow meter and absorbed in a solution of isoprene in methylene chloride (50 g. of isoprene per 1350 cc. methylene chloride). The absorption was conducted at a temperature of about $-6°$ C. After all the materials were added to the reaction, the temperature of the mass was lowered to $-30°$ C. and stannic chloride catalyst (0.2265 mole) diluted with 150 cc. of methylene chloride was added in increments, the first increment being 40 cc., and the reaction mass was then stirred. After an induction period of 30 minutes the reaction mass began to turn faintly yellow, indicating reaction. With this catalyst increment, the temperature rose slowly to $-20°$ C. After the initial isotherm, the temperature was reduced to $-25°$ C. by external cooling. The remainder of the catalyst was then added incrementally and the temperature was maintained at $-25°$ C. After final catalyst addition, stirring was continued for 30 minutes. At this point 700 cc. of methyl alcohol were added to terminate the polymer and to deactivate the catalyst. The solution was then stirred and the copolymer separated out. The lower layer consisted of methylene chloride, methanol, low molecular weight copolymer, polyisobutylene, polyisoprene, dimers and trimers. The upper layer was essentially all liquid isobutylene-isoprene rubber. The upper layer was stripped free of solvent in a flask equipped with a Vigreaux column, first at atmospheric pressure, and finally under vacuum. The yield of liquid rubbery isoprene-isobutylene copolymer (liquid polymer A) was 470 g.

When the foregoing procedure is repeated, using butadiene or piperylene as the diolefin in lieu of isoprene, similar results are obtained.

When 2 parts of sulfur, 0.2 parts of tellurium diethyl dithiocarbamate, 40 parts of carbon black and 5 parts of zinc oxide, are blended with 100 parts of liquid polymer A, and maintained at about $150°-180°$ F. for 2 to 3 days, a tough, cured rubber is obtained. The cured polymers have a wide variety of uses. Thus, they find application in electrical wire insulation, tank linings, cements, hoses, and belting.

It is to be understood that other Lewis-acid and Friedel-Craft type catalysts such as aluminum trichloride and boron trifluoride will catalyze this reaction.

These copolymers, containing a curing agent and other additives, can be cured to a solid product at a temperature of about 70° F. to 250° F. for a period of from about 10 hours to about 10 days. Normally, the completion of the cure is determined by visual inspection.

The propellants of this invention have been found to possess a relatively high autoignition temperature, above 130° F. and in many cases over 500° F. This high autoignition temperature permits of the safe handling of these propellants under normal conditions.

Propellants may be prepared from these liquid polymers by the interblending of an oxidizer and a curing agent followed by curing. Because of the inert character of the isoolefin-diolefin polymers, a wide variety of solid oxidizers may be combined with these polymers. Typical of suitable inorganic oxidizers are the alkali metal and alkaline earth metal perchlorates, chlorates, nitrates, chromates, dichromates and permanganates. Illustrative of such oxidizers are lithium perchlorate, potassium perchlorate, calcium perchlorate, potassium chlorate, calcium chlorate, potassium chromate, potassium dichromate, potassium nitrate, lithium nitrate, potassium permanganate and calcium nitrate. Likewise ammonium salts of the above-mentioned anions can be used such as ammonium perchlorate, ammonium nitrate, ammonium dichromate and ammonium permanganate. Still other suitable inorganic oxidizers are hydrazine perchlorate and nitronium perchlorate. Illustrative of the organic oxidizers are hydrazine nitroformate, cellulose nitrate and guanidine nitrate.

In general, the propellant compositions of this invention comprise:

liquid polymer: about 5 to about 25 parts by weight per 100 parts of total propellant composition,
oxidizer: about 10 to about 90 parts by weight per 100 parts of total propellant composition,
curing agent: an effective amount in the order of about 0.5 to about 5 parts by weight per 100 parts of total propellant composition, with any desired additional ingredients being present in the balance of the composition which can include combustion additives, fillers, stabilizers, plasticizers, etc.

More preferably, the propellant composition comprises:

liquid polymer: about 5 to about 20 parts by weight per 100 parts of total propellant composition,
oxidizer: about 65 to about 72 parts by weight per 100 parts of total propellant composition,
curing agent: about 1 to about 3 parts by weight per 100 parts of total propellant composition.

The curing agents which may be used in my above formulations are varied and many. Illustrative of suitable curing agents are sulfur, compounds containing bound sulfur such as mercaptobenzothiozole, para quinone dioxime, methyol phenolformaldehyde resins and p-dinitroso benzene. It is to be understood that there may be employed in conjunction with the curing agent, a curing catalyst or accelerator. Thus, for example, when sulfur is the curing agent, accelerators of the thiuram sulfide and dithiocarbamate types may be used at a concentration of about 0.5 to 2 parts per 100 parts of the liquid polymer. Typical of such accelerators are tetramethylthiuram disulfide, selenium dimethyldithiocarbamate, copper diethyldithiocarbamate and tellurium dibutyldithiocarbamate. Similarly, curing with para quinone dioxime may be promoted by lead dioxide, and cure with methyol phenolformaldehyde resin or para dinitroso benzene may be promoted with stannous chloride.

Combustion additives such as the powdered metals, i.e., powdered aluminum, powdered beryllium, etc., may also be added to the propellant compositions of this invention. The preferred powdered metals are those having an average particle size of 25–28 microns. These powdered metal combustion additives serve to increase the specific impulse of the resulting propellant. These combustion additives are generally advantageously employed in an amount of from about 25 to about 200 parts by weight for each 100 parts of the isoolefin-diolefin polymer used in the formulation. Preferred of my propellants are those in which the amount of oxidizer plus combustion additive constitutes about 75 to about 90% by weight of the total propellant composition with the propellant having an oxygen balance of about 0 to about —60, calculated on the basis of total conversion of the carbon, hydrogen and metal in the propellant to carbon dioxide, water and metal oxide, respectively.

The propellant compositions of this invention may contain optionally, in addition to the above-mentioned ingredients, other additaments such as wetting agents, stabilizers, fillers, plasticizers, and processing aids.

Thus, there may be added to the propellant composition prior to curing from about 5 to about 50 parts by weight of a plasticizer per 100 parts of liquid isoolefin-diolefin polymer. Preferred plasticizers are essentially saturated materials of relatively low polarity such as hydrocarbon oils, polyisobutylene, fluorinated plasticizers, waxes, asphalts, higher aliphatic and aromatic esters and resins such as hydrogenated ester gums. The preferred plasticizers for use with quinon and para dinitroso benzene cured systems are polyisobutylene and hydrocarbon oils. The use of these plasticizers in such systems has been found to facilitate the ease with which the propellant ingredients are interblended. For example, when a para-dinitroso benzene cured propellant was plasticized with polyisobutylene, the interblending temperature was reduced from 180° F. to 110°F.

The propellant interblending procedure to be followed in the practice of this invention is as follows: a liquid polymer, as defined above, is added to an internal mixer and is degassed at about 120° to about 350°F. The temperature is then brought to a range of about 100° to 200°F. for mixing at which time the wetting agents, stabilizers, fillers, processing aids, plasticizers and combustion additives are added to the polymer and mixed for a period of time necessary for their incorporation into the polymer. The oxidizer, or oxidizers, are then added in increments and mixed under vacuum. After all the oxidizer has been incorporated, the curative is added and mixed under vacuum until it is incorporated. The mixture is then cast, preferably under vacuum, from the mixer into containers. Many modifications of this procedure are possible. Thus, the liquid rubber and the plasticizer may be added simultaneously to the mixer.

The mixer which we have found to be particularly effective for interblending my propellant ingredients is that known commercially as the P mixer. The P mixer is manufactured by Baker-Perkins, Inc., of Saginaw, Mich., and it can be equipped with facilities for heating, cooling, and vacuumizing propellant batches during mixing.

The examples which follow are for purposes of illustration only, and should not be regarded as limitative in any way. Except as otherwise indicated, percentages are by weight.

EXAMPLE I

The internal mixer (Perkins-Baker) was preheated to 180°F., and 15.6 parts by weight of the liquid isobutylene-isoprene copolymer (Polymer A) and 6.3 parts of polyisobutylene plasticizer were added. Vacuum of about 29 inches Hg was applied for about 30 minutes to degas. Then, the temperature was lowered to 150°F. and 20 parts of aluminum powder having an average particle size of 25 to 28 microns, was added, and these ingredients were mixed until the aluminum was completely wetted down. The mixture was then degassed under vacuum for 10 minutes at 150°F. Then, 55 parts of hydrazine perchlorate were added in 4 equal increments, with 5 minutes of mixing between the addition of each increment. Thirty-one parts of Polyac curing agent (a mixture of 25% by weight of p-dinitrosobenzene and 75% of paraffin wax) were then added and mixed for 5 minutes at atmospheric pressure. Then vacuum was gradually applied while mixing until after 15 minutes, the pressure was less than 1 inch Hg. During this time the temperature was maintained at 150°F. Mixing was continued under these conditions for an additional 30 minutes. The mixture was then cast and cured for 2 days at 150°F. The resulting product was rubbery. A specimen of this propellant was put in a copper block, and the block was heated. The specimen was found to have an autoignition temperature of 510°–590°F. as evidenced by the emission of grey vapors.

EXAMPLE II

The procedure of Example I was repeated except that that hydrazine nitroformate was used as the oxidizer in lieu of hydrazine perchlorate. The resulting propellant was rubbery, and found to have an autoignition temperature of 130°–150°F. as indicated by the emission of yellow vapors. The hydrazine nitroformate employed in this propellant formulation was prepared by mixing 3.3 grams of a 12.5% solution of nitroform in isopropanol/methanol (50/50 by volume). After allowing the mixture to remain at room temperature for several hours, hydrazine nitroformate crystals in the form of long needles were observed. Crystallization and precipitation of the hydrazine nitroformate was completed by the addition of 5 ml. of carbon tetrachloride. The crystals (0.5 grams) were recovered by filtration.

EXAMPLE III

To the mixer employed in Example I, was added 15 parts by weight of aluminum powder and 18.95 parts of liquid polymer A. After thorough mixing there was added 65 parts of potassium perchlorate, 0.3 parts of para quinone dioxime, as the curing agent, and 0.75 parts of lead oxide as the curing agent activator. After mixing for 30 minutes at about 150°F., the mixture was cast and cured for 2–3 days at 150°F. The propellant obtained was rubbery.

EXAMPLE IV

The procedure of Example III was repeated using 65 parts of potassium perchlorate, 15 parts of aluminum powder, 16.8 parts of liquid polymer A, 2.4 parts of a low molecular weight methylol phenol-formaldehyde resin (sold under the trade name of Amberol ST–137 by Rohm & Haas) as the curing agent and 0.8 parts of stannous chloride as a crosslinking catalyst. Upon mixing and curing as in Example III, a tough, rubbery product was obtained.

EXAMPLE V

To the mixer were added 15 parts of aluminum powder, 13.4 parts of liquid polymer A , 5 parts of polyisobutylene plasticizer and 0.40 parts of stannous chloride. After several minutes, 65 parts of ammonium perchlorate was added and mixing continued. Then 1.2 parts of low molecular-weight methylol phenol-formaldehyde resin was added. After mixing at 150° F. for 30 minutes, the mixture was cast and cured for 4–5 days at 180° F. The propellant obtained was rubbery in nature.

EXAMPLE VI

There was added to the mixer 13.47 parts of liquid polymer A which was degassed at about 150° F. To the polymer were added 15 parts of powdered aluminum, 0.1 part of lecithin, 4.90 parts of a fluorinated plasticizer which is the ester of a fluorinated alcohol and pyromellitic acid (sold by Du Pont under the trade name Zonyl E–7), 0.88 part of lead dioxide, 0.20 part of zinc oxide and 0.10 part of stearic acid. These materials were then mixed under vacuum at 150° F. for 10 minutes. Ammonium perchlorate was then added in an amount of 0.65 part. Mixing was continued under vacuum for 20 minutes. Then 0.35 part of para quinone dioxime was added and additional mixing continued for 45 minutes. The mixture was then cast and cured at 180° F. for 1.5 days. The product was rubbery.

EXAMPLE VII

Example VI is repeated except that a coated nitronium perchlorate [This compound may be prepared by the method shown by Goddard et al., C. A. 41, 1944 (1947)], is used in lieu of ammonium perchlorate. The cured product possesses rubber-like properties. The coated nitronium perchlorate is prepared by passing ammonia vapors over the nitronium perchlorate crystals. This produces an impervious ammonium perchlorate coating on the surface of the crystals. This coating prevents the nitronium perchlorate from decomposing at the temperature of the curing process.

The following example illustrates a propellant containing an 87.5% solids loading.

EXAMPLE VIII

To the mixer was added 17.5 parts of aluminum powder, 7.82 parts of liquid polymer A and 1.53 of an aliphatic hydrocarbon oil plasticizer (sold by the Sun Oil Company under the trade name of Sun Process Aid 516). After mixing at 150° F. for 10 minutes 70 parts of ammonium perchlorate was added and mixing continued for 20 minutes. Three and fifteen one-hundredths parts of a mixture of 75% by weight paraffin wax and 25% by weight of p-dinitroso benzene were then thoroughly blended into the batch. A rubbery propellant was obtained upon casting and curing at 110° F. for 2 days.

EXAMPLE IX

Following the mixing and curing procedures of Example VIII, a tough, rubbery propellant was obtained from 65 parts by weight of lithium perchlorate, 15 parts powdered aluminum, 17.45 parts of liquid polymer A, 0.75 part of para quinone dioxime and 1.8 parts of lead dioxide.

EXAMPLE X

To the internal mixer was added 0.156 gram of liquid polymer A, 0.20 gram of powdered aluminum and 0.063 gram of polyisobutylene, and the mixture was degassed under vacuum. After mixing at 150° F. until the aluminum was completely wetted, 0.55 gram of ammonium nitrate was added and mixing continued for 30 minutes. Then 0.031 gram of the curing agent of Example I was added. After mixing for 45 minutes, the mixture was cast and cured at 150° F. for 2 days. The rubbery product had an auto-ignition point of 515°–560° F. as evidenced by the emission of grey fumes upon the heating of the propellant to this temperature.

EXAMPLE XI

Following the mixing procedures of Example VIII, a 17 lb. propellant batch was prepared from 68 parts ammonium perchlorate, 16 parts powdered aluminum, 2 parts polyisobutylene, 10 parts of liquid polymer A and 4 parts of the curing agent consisting of 75% paraffin wax and 25% p-dinitroso benzene. The mixture was cast into a cylindrical form, 6 inches in diameter and 22 inches long. After curing several days at 100° F., this solid rocket motor was fired, and the specific impulse ($L_s$) was measured and found to be 240.2 seconds. The burning rate was 0.269 in./sec.

EXAMPLE XII

Example XI was repeated using 71.5 parts ammonium perchlorate, 16 parts powdered aluminum (87.5% total solids) 7.61 parts liquid polymer A, 3.40 curing agent and 1.49 parts hydrocarbon oil plasticizer. Motor firing of this propellant yielded a specific impulse of 244.5 seconds.

EXAMPLE XIII

Following the mixing procedure set forth in Example I, there is interblended 68 parts of ammonium perchlorate, 16 parts of powdered aluminum, 3.9 parts of polyisobutylene, 0.1 part of fluorinated ester plasticizer (Zonyl E–7), 10.7 parts of liquid polymer A, 0.62 part of zinc oxide, 0.2 part of sulfur, 0.125 part of tetramethyl thiuram disulfide, 0.06 part of a mixture consisting of 1 part 2-mercaptobenzothiazole and 2 parts tetramethyl thiuram disulfide, 0.15 of tellurium dimethyl dithiocarbamate and 0.06 parts of carbon black. The mixture is cured for 2 days at 180° F., and a rubbery product is obtained.

Various fillers in amounts up to 25 parts by weight per 100 parts of the liquid isoolefin-diolefin polymer may be used to improve the properties of the curing propellant. For example, the tear resistance of the product can be improved by the addition of channel or furnace blacks. Other fillers such as magnesium carbonates, ultrafine silicas and calcium metasilicate may also be used.

The propellants of this invention are quite stable. However, if desired, their stability can be further enhanced by the addition of stabilizers in the amount of about 0.1–5 parts by weight per 100 parts of the liquid polymers. Any of the common rubber stabilizers may be used, i.e., phenyl - B - naphthylamine, 2,2,4-trimethyl-6-phenyl-1,2-dihydroquinoline and trioctyl phosphite.

Likewise, the interblending of the various ingredients may be assisted by the incorporation of a small amount, on the order of 0.1–5 parts per 100 parts liquid polymer, of a wetting agent such as lecithin.

In addition to those additives already mentioned, various other processing aids may be added to aid in the blending of the various ingredients or to improve the physical characteristics of the cured propellant. Thus from about 1 to about 10 parts of zinc oxide and/or stearic acid per 100 parts of liquid polymer may be added to improve the modulus of elasticity.

The liquid rubbery polymers of this invention normally are hydrocarbons; however, my polymers can be altered or modified to suit particular applications. Thus, the liquid polymer can be conveniently chlorinated or brominated in the reaction mass or after processing, if desired. Likewise, the liquid polymers of this invention may be modified by the addition of functional terminal groups such as hydroxyl and carboxyl groups. These functionally terminated polymers can be further reacted with various complementary reactive materials to form polyurethanes, polyamides, polycarbonates and the like.

For example, an isoolefin-diolefin polymer containing carboxyl groups at each end of the polymer chain may be obtained by the polymerization of an isoolefin such as isobutylene with a diolefin such as butadiene or isoprene in an isoolefin/diolefin ratio of from about 10 to 1/50 to 1 in the presence of an anionic catalyst such as lithium napthalene, said catalyst being in a solution of tetrahydrofuran. Upon the injection of bone-dry carbon dioxide into the polymerization mass the lithium salt of the diacid is obtained. The free diacid is obtained from the salt by reaction with at least a stoichiometric amount of a mineral acid such as hydrochloric acid.

The resulting long-chain isobutylene-isoprene copolymer containing terminal —COOH groups can be advantageously reacted with a diamine such as hexamethylene diamine to form a polyamide. Likewise, the diacid may be reacted with a compound such as tris[1-(methyl)aziridinyl]phosphine oxide to form a propellant binder.

If, in lieu of carbon dioxide, there is added to the above-mentioned polymerization mass, ethylene oxide or formaldehyde, there is obtained the lithium salt of the dialcohol. This salt may be converted to the free dialcohol by reaction with a stoichiometric amount of hydrochloric acid. This —OH terminated copolymer can then be converted to a polyurethane by reaction with an equivalent amount or an excess of a diisocyanate such as 3-nitraza-1,5-pentane diisocyanate, hexamethylene diisocyanate, toluene diisocyanate, durene diisocyanate and the like. If desired, the polyurethane formation may be catalyzed with a heavy metal chelate such as ferric acetylacetonate. Alternatively, the dialcohol may be converted to a polycarbonate by reaction with phosgene or the bis-chloroformate of an aromatic or aliphatic diol.

It will be understood that various modifications may be made in this invention without departing from the spirit thereof or the scope of the appended claims.

I claim:
1. A thermally stable rubber composition comprising the reaction product of a linear, essentially hydrocarbon, liquid isoolefin-diolefin copolymer having a molecular weight of from about 1000 to about 5000 and consisting essentially of isoolefin units of the formula:

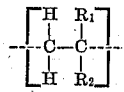

wherein $R_1$ and $R_2$ are lower alkyl groups, and diolefin units of the formula:

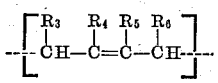

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, and an effective amount of a curing agent.

2. A thermally stable rubber composition comprising the reaction product of 5–25 parts by weight per 100 parts of the rubber composition of a linear, essentially hydrocarbon, liquid isoolefin-diolefin copolymer having a molecular weight of from about 1000 to about 5000 and consisting essentially of isoolefin units of the formula:

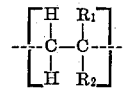

wherein $R_1$ and $R_2$ are lower alkyl groups, and diolefin units of the formula:

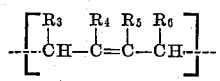

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, and 0.5 to 5 parts of a curing agent for each 100 parts of said rubber composition.

3. A thermally stable rubber composition comprising the reaction product of about 5 to about 25 parts by weight for each 100 parts of the rubber composition of a linear, essentially hydrocarbon, liquid isoolefine-diolefin copolymer having a molecular weight of from about 1000 to about 5000 and consisting essentially of isoolefin units of the formula:

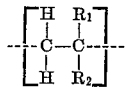

wherein $R_1$ and $R_2$ are lower alkyl groups, and diolefin units of the formula:

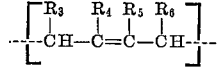

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, about 0.5 to 5 parts of a curing agent per 100 parts of rubber composition, and about 10 to 75 parts of a filler for each 100 parts of said rubber composition.

4. A high energy, thermally stable rubber propellant composition comprising the reaction product of about 5 to 25 parts by weight per 100 parts of propellant of a linear, essentially hydrocarbon, liquid isoolefin-diolefin copolymer having a molecular weight of from about 1000 to about 5000 and consisting essentially of isoolefin units of the formula:

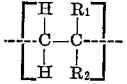

wherein $R_1$ and $R_2$ are lower alkyl groups, and diolefin units of the formula:

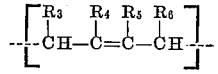

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, about 0.5 to 5 parts of a curing agent per 100 parts of propellant, and about 10 to 75 parts of an oxidizer per 100 parts of propellant, said propellant having an oxygen balance of from about 0 to about —60.

5. The composition of claim 4 wherein the oxidizer is ammonium perchlorate.

6. The composition of claim 4 wherein the oxidizer is ammonium nitrate.

7. The composition of claim 4 wherein the oxidizer is nitronium perchlorate.

8. The composition of claim 4 wherein there is present a powdered metal combustion additive in an amount of from about 25% to about 200%, based on the weight of the isoolefin-diolefin copolymer.

9. The composition of claim 8 wherein the total amount of oxidizer and powdered metal combustion additive constitutes about 75 to about 90 percent by weight of the total propellant composition.

10. A high energy, thermally stable rubber propellant composition comprising the reaction product of about 5 to about 25 parts by weight per 100 parts of propellant of a linear, essentially hydrocarbon, liquid isoolefin-diolefin copolymer consisting essentially of isobutylene units of the formula:

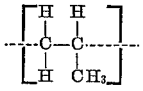

and isoprene units of the formula:

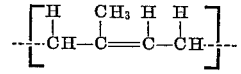

the ratio of said isobutylene units to isoprene units in said copolymer being from about 20 to 1 to about 100 to 1, about 0.5 to 5 parts of a curing agent per 100 parts of propellant, and about 10 to 75 parts of an oxidizer per 100 parts of propellant, said propellant having an oxygen balance of about 0 to about −60.

11. The method of preparing a thermally stable rubber composition comprising interblending a linear, essentially hydrocarbon liquid isoolefin-diolefin copolymer having a molecular weight of from about 1000 to about 5000 and consisting essentially of isoolefin units of the formula:

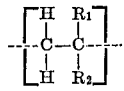

wherein $R_1$ and $R_2$ are lower alkyl groups, and diolefin units of the formula:

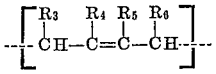

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, with an effective amount of a curing agent, and heating the interblended mixture to effect curing.

12. A method of preparing a thermally stable rubber composition comprising interblending about 5 to 25 parts by weight per 100 parts of the rubber composition of a linear, essentially hydrocarbon liquid isoolefin-diolefin copolymer, having a molecular weight of from about 1000 to about 5000, consisting essentially of isoolefin units of the formula:

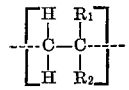

wherein $R_1$ and $R_2$ are lower alkyl groups and diolefin units of the formula:

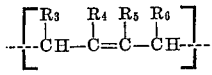

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, and about 0.5 to about 5 parts of a curing agent per 100 parts of the rubber composition, and heating the interblended mixture to effect curing.

13. A method of preparing a thermally stable rubber composition comprising interblending about 5 to 25 parts by weight per 100 parts of the rubber composition of a linear, essentially hydrocarbon, liquid isoolefin-diolefin copolymer having a molecular weight of from about 1000 to about 5000 and consisting essentially of isoolefin units of the formula:

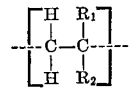

wherein $R_1$ and $R_2$ are lower alkyl groups, and diolefin units of the formula:

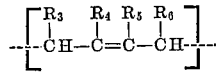

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, about 0.5 to 5 parts of a curing agent per 100 parts of the rubber composition, and about 10 to 75 parts per 100 parts of the rubber composition of a filler, and heating the interblended mixture to effect curing.

14. A method of preparing a high energy thermally stable rubber propellant composition comprising interblending about 5 to 25 parts by weight per 100 parts of propellant of a linear, essentially hydrocarbon, liquid isoolefin-diolefin copolymer having a molecular weight of from about 1000 to about 5000 and consisting essentially of isoolefin units of the formula:

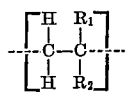

wherein $R_1$ and $R_2$ are lower alkyl groups, and diolefin units of the formula:

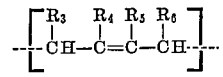

wherein $R_3$, $R_4$, $R_5$ and $R_6$ are selected from the group consisting of hydrogen and lower alkyl, the ratio of said isoolefin units to said diolefin units in said copolymer being from about 20 to 1 to about 100 to 1, with 0.5 to 5 parts of a curing agent per 100 parts of propellant, and about 10 to 75 parts of an oxidizer per 100 parts of propellant, and heating the interblended mixture to effect curing.

15. The method of claim 14 wherein the oxidizer is ammonium perchlorate.

16. The method of claim 14 wherein the oxidizer is ammonium nitrate.

17. The method of claim 14 wherein the oxidizer is nitronium perchlorate.

18. The method of claim 14 wherein there is present a powdered metal combustion additive in an amount of from about 25 to about 200 percent, based on the weight of the isoolefin-diolefin copolymer.

19. The method of claim 18 wherein the total amount of oxidizer and powdered metal combustion additive constitutes about 75 to about 90 percent by weight of the total propellant composition.

20. A method of preparing a high energy, thermally stable rubber propellant composition comprising interblending about 5 to 25 parts per 100 parts of propellant of a linear, essentially hydrocarbon, liquid isoolefin-diolefin copolymer consisting essentially of isobutylene units of the formula:

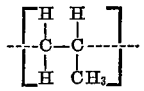

and isoprene units of the formula:

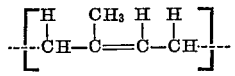

wherein the ratio of said isobutylene units to isoprene units in said copolymer is from about 20 to 1 to about 100 to 1, with about 0.5 to 5 parts of a curing agent per 100 parts of propellant, and about 10 to 75 parts of an oxidizer per 100 parts of propellant, and heating the interblended mixture to effect curing.

References Cited

UNITED STATES PATENTS

| | | | |
|---|---|---|---|
| 3,026,311 | 3/1962 | Coover et al. | 260—93.7 |
| 3,026,312 | 3/1962 | Hagemeyer et al. | 260—93.7 |
| 3,026,672 | 3/1962 | Sammons | 149—19 |
| 3,027,282 | 3/1962 | Sammons | 149—19 |
| 3,038,872 | 6/1962 | Wolf | 260—41.5 |
| 3,041,303 | 6/1962 | Nelson | 260—41.5 |
| 2,494,766 | 1/1950 | Lightbown et al. | 260—85.3 |
| 2,519,100 | 8/1950 | Baldwin | 260—85.3 |
| 3,000,175 | 9/1961 | Lawrence | 149—19 |
| 3,000,716 | 9/1961 | Lawrence et al. | 149—19 |
| 3,012,866 | 12/1961 | Zucrow | 149—19 |

BENJAMIN R. PADGETT, *Primary Examiner.*